United States Patent [19]

Nakamura

[11] 4,155,558

[45] May 22, 1979

[54] COMPLETELY FLUIDTIGHT AND FRICTIONLESS SHAFT SEAL PACKING

[76] Inventor: Giichi Nakamura, 2, Gamocho 4-chome, Joto-ku, Osaka, Japan

[21] Appl. No.: 854,612

[22] Filed: Nov. 25, 1977

[51] Int. Cl.² .................. F16J 15/44; F16J 15/06
[52] U.S. Cl. ................................. 277/53; 277/124; 277/125
[58] Field of Search ........... 277/53, 102, 103, 123–125

[56] References Cited

U.S. PATENT DOCUMENTS

| | | | |
|---|---|---|---|
| 2,264,147 | 11/1941 | Dunlevy | 277/124 |
| 2,903,281 | 9/1959 | Avery | 277/124 |
| 3,467,394 | 9/1969 | Bryant | 277/125 X |
| 3,945,649 | 3/1976 | Nakamura | 277/123 |

FOREIGN PATENT DOCUMENTS 705444  3/1954  United Kingdom ............. 277/53

Primary Examiner—Robert S. Ward, Jr.
Attorney, Agent, or Firm—George B. Oujevolk

[57] ABSTRACT

A packing apparatus comprising: a plurality of thin, annular packing members each embracing the arched portions in the cross section being so arranged in an axial layer, with their peripheral parts held in contact with a shaft, so as to form gaps with adjacent members at the portions in contact with the shaft, and concave and convex cover members being inserted at both ends of the packing assembly thus arranged.

1 Claim, 2 Drawing Figures

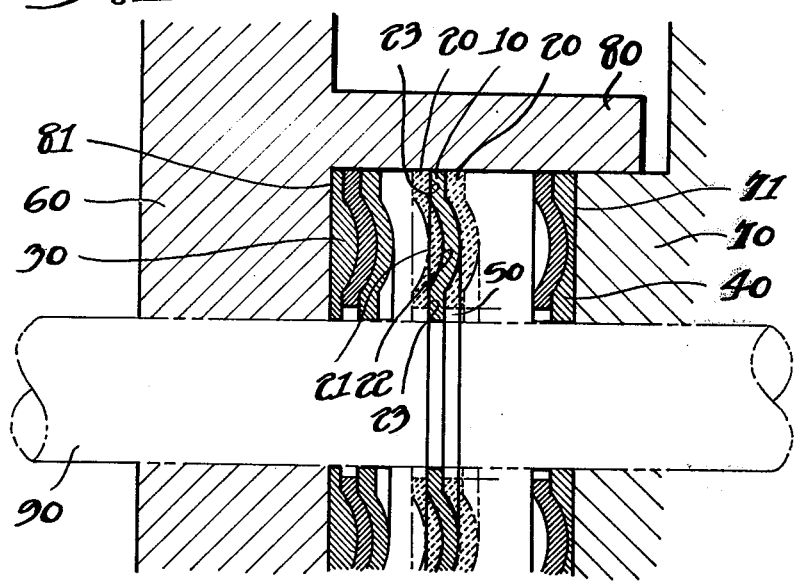
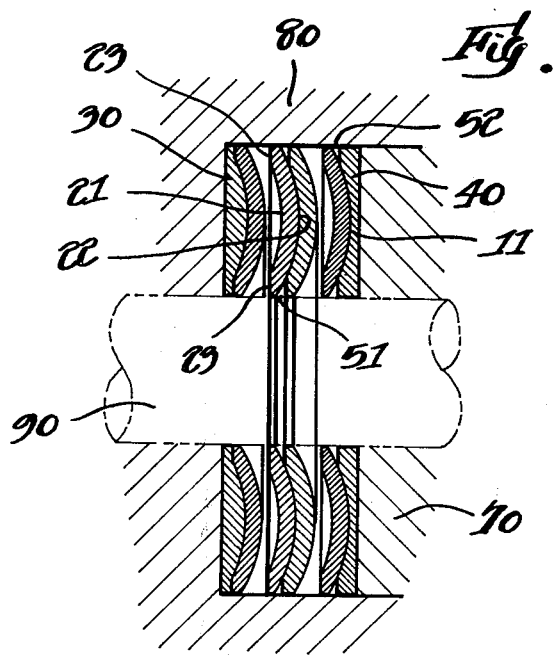

COMPLETELY FLUIDTIGHT AND FRICTIONLESS SHAFT SEAL PACKING

The present invention relates to a labyrinth packing apparatus to prevent a leakage of a high pressure fluid in a passage where a rotating shaft, (in a centrifugal pump or a turbine shaft, a reciprocating piston shaft, for example a plunger pump) passes through a stuffing box from a casing filled with a high pressure fluid, and is particularly concerned with an improvement of my prior invention (U.S. Pat. No. 3,945,649, entitled "Completely Fluidtight and Frictionless Shaft Seal Packing").Generally speaking, a labyrinth packing comprises a series of flanges not in contact with each other alternately projecting from a shaft and the casing of a stuffing box forming a continuous gap so as to decrease fluid leakage pressure and reduce fluid leakage. Since the design of a conventional labyrinth packing is based on the provision of a gap between an inner peripheral part of a packing and an outer peripheral part of a shaft, it is impossible to accomplish a perfect sealing with no fluid leakage. In addition, the mechanism of such conventional labyrinth packings, requires materials of high quality and therefore sophisticated processing to manufacture flanges and involves considerable expense and restricts the wide application of the concept in casings of stuffing boxes for general-purpose machinery and equipment through which shafts pass.

In view of the above and departing completely from the concept of conventional labyrinth packing comprising a visible gap disposed between an inner periphery part of the packing and an outer periphery part of the shaft, I have disclosed in my U.S. Pat. No. 3,945,649, issued Mar. 23, 1976 a novel construction of the labyrinth packing arrangement to prevent leakage of a high pressure fluid out of a casing of a stuffing box at the passage where a shaft passes through the said casing filled with the high pressure fluid. This arrangement operates basically on the principle that an inner periphery part is not allowed to come in contact with an outer periphery part of the shaft, while there is no visible gap left between them; fitted in an axial layer form on a rotating or reciprocating shaft which passes through a stuffing box to a casing filled with a high pressure fluid are a plurality of thin, annular packing members manufactured from resilient materials of a lower friction coefficient against the shaft to thereby minimize a compressive force exerted on the shaft when said packing members contact the shaft. Each packing member, with its inner end in contact with an outer periphery of the shaft, forms suitable gaps with the adjacent ones, and a plurality of the packing members thus assembled are clamped from both ends in parallel to the shaft so as to adjust a compressive force of their inner peripheral parts against the outer peripheral part of the shaft; for carrying my patented invention into practice, I have suggested an apparatus comprising a plurality of felt materials or sheet materials assembled and subsequently covered at both ends with flexible solid sheets, or an assembly of a plurality of thin, annular plates produced either from felt or sheet materials impregnated with synthetic resin liquids or from thermoplastic resin or thermosetting resin sheets.

In accordance with my U.S. Pat. No. 3,945,649, the principle on which the arrangement operates to produce a labyrinth effect is that each packing member is provided with an inner periphery part thinner than other portion thereof to dispose a labyrinth gap with its adjacent members when getting in contact with a shaft. It should be noted that the principle can be directly utilized alone in a stuffing box used to seal against a fluid of relatively low pressure simply because inner peripheral parts of packing members are forced out of the position by the pressure higher than a given pressure, thus leading to leakage of a fluid out of the casing. In order for the arrangement to withstand a high fluid pressure to effect a seal, therefore, glands are tightened to press packing members until their arched segments are distorted to a flat shape, thereby compressing their inner periphery parts in close contact with the outer periphery of the shaft. It is required in this case that packing members be free from any tackiness to prevent their sticking on the outer peripheral part of the shaft. In this way, the packing members must be formed in an annular shape of an arched section of flexible, felt or woven-fabric formed sheets of mineral fibers, such as asbestos, rock wool and glass, impregnated with synthetic resin substances to provide with a suitable degree of hardness and resilience and to minimize their friction against the shaft, thereby causing a compressive force toward the shaft progressively but not abruptly by instantaneous extension of their arched portions when being pressed axially. It should be noted that fibers of plant origin with their inferior heat resistance cannot be used for this purpose.

In order that the above mentioned, desired effect may be produced, the present invention comprises convex and concave cover plates of appropriate material fixed on the front and back side of an arch formed assembly of packing members as viewed from the side. Such an arrangement, even if the packing members employed are rather flexible or they are too compressed axially by tightening the glands, prevents the arched portions from abruptly being extended to exert an increased compressive force against the shaft. This insures a prolonged service life.

In my U.S. Pat. No. 3,945,649, I have disclosed a method of securing a labyrinth effect by gaps formed with the use of packing members provided with two sectional portions of different thickness, whereby such packing members, due to their rather complex sectional shape, have major disadvantages of increased production costs resulting from the intricate production technique involved and poor appearance assumed by the resulting assembled packing apparatus. The method of producing a labyrinth effect is materially improved in the present invention by interposing separators between two packing members made of resilient sheet material, this sheet material having the same outer diameter as the packing members, but an inner diameter slightly larger than, the packing members to thereby provide proper-sized gaps between two of the packing members.

FIG. 1 is a longitudinal cross-sectional view of one embodiment of the invention; and, FIG. 2 is a longitudinal cross-sectional view of a second embodiment of the inventive concept.

More particularly, referring to FIG. 1 of the drawing, FIG. 1 illustrates a labyrinth packing apparatus of the present invention comprising a plurality of annular packing members and annular separator members both having arched sections alternately fitted in an axial layer on an outer periphery part of a projecting shaft 90 of d in diameter passing through a wall 81 of a casing 80 filled with a high pressure fluid, and cover members 30 and 40 adapted respectively on both ends of the assembled packing and separator members, wherein the thus constructed arrangement is slightly tightened between a flat bottom surface of a stuffing box and a flat end surface of a gland;

As shown in FIG. 1, when a proper number of packing members and separator members fitted in an axial layer within a stuffing box 80 with a flat bottom 81 are tightened at a bottom surface 71 of a gland 70, the packing members having a winged arch form in the cross section will be disposed with separator members interposed each between two of them and will have their inner peripheral parts in uniform contact with an outer peripheral surface of the shaft to produce a secured labyrinth effect, thereby preventing a leakage of high pressure fluid. In other words, a fair degree of the resilience and flexibility of these packing members reduce substantially a compressive force P exerted by their inner pheripheral parts on the outer pheripheral of the shaft, while decreasing materially the friction coefficient f, and thus lessen a friction force ($F = P - f$) acting between inner pheripheral parts of packing members and an outer pheripheral surface of a shaft, thus achieving the object of a labyrinth packing effect in accordance with the present invention.

In manufacturing such a kind of packing members, it is necessary to construct different metal molds separately for packing and separator members and individually conforming to the inner and outer diameter and contour because packing members differ in inner diameter from separator members, though being equivalent in outer diameter and contour.

Furthermore in practicing the present invention, packing and separator members must be manufactured in a wide variety of sizes and contours with the use of a corresponding number of metal molds individually constructed, so as to comply with outer diameters of shafts and inner diameters of stuffing boxes to which they are to be fitted, whereby the shafts and stuffing boxes vary widely in diameter depending on the type and size of stuffing boxes being chosen individually for different kinds of high pressure fluids to be handled. Therefore, packing and separator members are very expensive when their required number is limited.

So as to reduce the cost associated with the necessity of constructing two metal molds for a given packing arrangement, the inventor contemplates constructing one metal mold for common use in manufacturing packing and separator members; in other words, packing members are molded to such a particular shape as may produce labyrinth gaps between two of them without a separator when being fitted in an axial layer on a shaft.

FIG. 2 is a sectional view illustrating an arrangement having a plurality of coupled packing members 10 fitted in an axial layer on a shaft with cover members 30 and 40 at both ends of the assembled packing members, so that the coupled packing members function both as packing members and separators. In FIG. 2 the packing member has a cross section such that the rear side may embrace an arched portion 21 and two flat segments 23 (wings) at its ends while its front side is cut off from flat segments obliquely along an arched portion. When packing members have a particular shape cross section as described are fitted in an axial layer on a shaft passing through a stuffing box, there are smaller gaps 51 produced each between two of the members getting their inner periphery parts into contact with an outer periphery surface of a shaft than the gaps 50 produced in the case separator members 20 are used in combination; in this way, a reduced labyrinth effect is obtained. On the other hand, gaps are disposed additionally between two of the packing members placing their outer periphery parts into contact with an inner periphery surface of a stuffing box, thereby producing an additional labyrinth effect. It is obvious from the foregoing that the packing members having the modified cross section operate to produce almost the same degree of the labyrinth effect as would be secured by the combined use of separator members.

What I claim:

1. A labryrinth packing arrangement comprising annular thin sheet, mineral fiber, molded packing members, impregnated with a synthetic resin of a cross-sectional configuration having an arched portion on the front and rear side and flat, thin sheet separator segment members of the same shape and cross section as said packing member with an inner diameter slightly larger than that of the packing members, a plurality of both members being alternately arranged in an array assembly; concave and convex cover members respectively disposed on the front and back side of said assembly, said packing arrangement thus being disposed over the outer periphery of a shaft which passes through the wall of a stuffing box casing filled with a fluid, said stuffing box having a flat end surface and said casing being tightened against said flat end surface of said stuffing box.

* * * * *